United States Patent [19]

Varrasso

[11] 3,826,903

[45] July 30, 1974

[54] METHOD AND APPARATUS FOR CONTROL OF CONDITIONS IN A PROCESS

[75] Inventor: Eugene C. Varrasso, Heath, Ohio

[73] Assignee: Owens-Corning Fiberglas Corporation, Toledo, Ohio

[22] Filed: Jan. 3, 1972

[21] Appl. No.: 215,047

[52] U.S. Cl............... 235/151.1, 65/2, 65/DIG. 13
[51] Int. Cl....................... C03b 37/00, G06f 15/46
[58] Field of Search........... 65/2, 9, 11 R, 11 W, 29, 65/160–164, DIG. 13; 235/150.1, 151.1, 151, 151.3; 340/172.5; 318/609, 610

[56] References Cited
UNITED STATES PATENTS

| | | | |
|---|---|---|---|
| 3,391,275 | 7/1968 | Bullock et al..................... | 235/151.1 |
| 3,391,316 | 7/1968 | Ross.......................... | 235/150.1 UX |
| 3,504,362 | 3/1970 | Feldmann ................. | 235/150.1 UX |
| 3,539,316 | 11/1970 | Trethewey ............................... | 65/2 |
| 3,582,629 | 6/1971 | Ross............................ | 235/151.1 |
| 3,598,975 | 8/1971 | Miller et al. ...................... | 235/151.1 |
| 3,628,129 | 12/1971 | Riley.......................... | 235/150.1 UX |
| 3,691,354 | 9/1972 | Ross et al. ....................... | 235/150.1 |

Primary Examiner—Joseph F. Ruggiero
Attorney, Agent, or Firm—Stailin & Overman; Myron E. Click

[57] ABSTRACT

The invention is disclosed herein in a method and apparatus for manufacturing a glass fiber mat. A fiber collecting surface is moved past a fiber deposition station. Glass fibers are provided, deposited, and processed in a mat-like mass on the collecting surface. Data is processed in a data processing means to obtain values representing the difference between the actual conditions and the desired conditions of the plurality of variables involved in the providing, depositing, and processing of the glass fibers to obtain a finished glass fiber mat with desired characteristics. The data processing means provides an operation change signal for at least one of the variables indicating the change necessary in a final control device for that one variable to eliminate a deviation between an actual and a desired condition for the variable. The operation change signal is stored in a supervisory control for the one variable, enabling more time for processing of data in the data processing means for the other variables being controlled. The operation of the final control device for the one variable is modified an amount dictated by the operation change signal stored in the supervisory control.

28 Claims, 6 Drawing Figures

METHOD AND APPARATUS FOR CONTROL OF CONDITIONS IN A PROCESS

BACKGROUND OF THE INVENTION

As the instrumentation approach in measurement and control of variables, apparatus and processes, has grown more sophisticated, it has become possible to completely automate various production lines so that better quality and more quantity may result. However, in production processes where variables are interrelated and where the interrelation changes when a different type of the same product is produced on the same production line, it is necessary to solve a number of problems in order to satisfactorily relinquish control of the production line to instrumentation. For example, where a production line is to be adapted for a large number of fibrous structure products of different densities, widths, and lengths, not only must the important variables be adjusted when starting to make these different products, but it is necessary to interrelate variables in order to insure that quality of the product is maintained and improved as well as improving the efficiency of the production line output.

When a glass furnace, a plurality of bushing feeders, or any other process is controlled by a data processing means such as a computer, it is necessary to sense the actual status of each of the conditions in the process and through the use of the data processing means provide corrective signals for controlling each condition. The sensing or sampling of the actual status of the various conditions is generally accomplished at various times which are not in sequence. Further, the polling or samplings for each condition may have different time spacings. When computer control was initiated it was necessary to take more readings because of the different relationships in the spacings between the input or sensing signals, thus requiring additional data processing capacity in order to take sensing signals or inputs at the desired time intervals and perform the correcting signal operations on a continuing basis. Data processing equipment generally has count periods representing the smallest time spacing between possible computer operations. To utilize the computer most efficiently each count period should be used for performing a sampling or control operation or other tasks.

If the data processing equipment in use has 100 channels it is obvious that it could control 100 loops. That is, a control loop could be assigned to each channel without regard to the time spacing or scan time between samplings or control operation of an individual loop. It was then desirable to select and coordinate loops having spaced scan times so that a plurality of loops might be controlled by each channel, preferably wasting as few of the count periods for that channel as possible. That is, a number of loops with spaced scan times were sequenced with respect to each other so that as many of the count periods of the data processing equipment were used as possible. This improvement is described in greater detail in U.S. Pat. No. 3,557,349, issued Jan. 19, 1971.

In the control of continuous process operations, such as the manufacture of glass fiber mats, there are normally a number of devices utilized in the process that tend to stay in the position or condition desired for the product being manufactured. In mat production these devices include controls for the width of the strand distribution, the hood width setting to confine the deposition of the fibers to a desired mat width, trim saws for removing unfinished edges or for obtaining an exact desired width of the finished mat, etc. Because the conditions of these devices tend not to drift under ordinary circumstances there is little need for the data processing apparatus to check the control loops which monitor and correct these devices during every program cycle. Thus, data processing apparatus or computer time has been wasted in the past in monitoring various process devices more frequently than necessary.

This portion of the problem relating to monitoring devices too frequently has been solved by providing a variable scan algorithm which allows data processing apparatus to check control loops only periodically instead of during every program cycle, to free the computer to do other tasks. This method and apparatus is disclosed and described in a copending application for Letters Patent of John M. Garst, Ser. No. 215,048 filed Jan. 3, 1972, which application is assigned to the same assignee to which this application is assigned.

Further complications arise, however, in the complete automation of process control lines since in conventional control devices for such a process line the data processing means or computer is used as a supervisory controller itself to open and close relays, actuate switching devices, etc. The computer usually contains a particular setpoint, deviation from which actuates relays, switching device, etc. to modify the operation of a final control device for a variable, initiating a modification which continues until the computer deenergizes the relay, deactuates the switching device, etc., to terminate the modification of the final control device. If the computer fails while the modification is being made, the change of operation of the final control device would continue until it could physically go no farther. An additional disadvantage of the conventional controls is that there generally must be some measurable motion before the computer can sense it and tell the control element to stop the motion. Therefore, the precision of the system may be dependent upon the amount of coasting a control element does after its drive has been turned off. The normal sensing and setpoint comparison by data processing apparatus is usually acceptable for computer control of temperature or the like, but may not be necessary or desirable for a number of devices utilized in the process that tend to stay close to or in the setpoint position or the condition desired for the product being manufactured. As noted above, in glass fiber mat production these devices include controls for the width of the strand distribution, the hood width setting, trim saws, etc.

Accordingly, it is an object of this invention to provide an improved method and apparatus for forming fibrous structures.

It is a further object of this invention to provide an improved method and apparatus for forming fibrous structures which includes a method and means for interposing a supervisory control between the data processing apparatus and the final control element where the variable being controlled, which enables the data processing apparatus to make the most efficient use of its available control time. Such ancillary means or step therefore eliminates the need for feedback to the computer before the change in the operation of the final control device can be stopped, the final control device does not have to make a movement before a feedback can tell the data processing apparatus to stop the movement, and the computer or data processing apparatus need determine only the amount the final control device needs to be changed. This permits the interface or supervisory control apparatus to effect the desired change while the data processing apparatus is freed to do other tasks.

A still further object of this invention is to provide an improved supervisory method and apparatus which may act as an interface between data processing means and a final control element in which the last signal given by the data processing means to the supervisory control is the correct signal, and in which the movement or change in the operation of a final control device may be terminated without direct data processing apparatus control.

SUMMARY OF THE INVENTION

The above objects and features of this invention have been illustrated herein in preferred embodiments of apparatus for manufacturing glass fiber mats. Although the invention is herein exemplified in specific detail by reference to glass fiber production, it will be apparent in view of the disclosure that it has application to production of other fibers or other mat materials as well. Further although the variable conditions shown as subjects of measurement and control are specific uses of the invention herein disclosed, it is to be noted that all embodiments are illustrative only and not limited in any sense to use with the respective apparatus, process, or product as disclosed herein.

The invention thus features methods and apparatus for interposition between and use with data processing means and a final control device for regulating a variable. The supervisory control apparatus includes means for receiving and storing an input signal indicating the amount of deviation of a variable from a desired condition, and means responsive to a stored input signal for actuating a final control device for the variable to modify the actual condition of the variable by an amount related in magnitude to the amount of deviation indicated by the stored input signal.

The control element actuating means may include switching means, means responsive to deviation information in a stored input signal for providing an actuating signal for the switching means, and means responsive to the amount of deviation information in the input signal for terminating the actuating signal after a length of time related to the amount of deviation indicated by the stored input signal.

The control device actuating means may further include means for providing a proportional range of signals related to the change in value of the controlled variable necessary to cause full control action by the final control device controlling the variable, means for selecting a proportional signal from the range of signals which is related to the desired control action of the final control device to obtain a desired condition of the variable controlled, and means for comparing the stored input signal with the selected proportional signal and providing an output signal to the final control device in response to deviation information in the stored input signal.

More specifically the control device actuating means may include integrator means responsive to a signal fed back from the comparing means output signal for providing a loop balancing signal for comparison with the selected proportional reference signal at the input of the comparing means. The integrator means is responsive to an output from the comparing means to change the value of the balancing signal in a direction to reduce the output of the comparing means. Means may also be included for controlling the amount of comparing means output signal which is fed back to the integrator means in order to determine the rate of reduction of the comparing means output signal, i.e. the time it takes to restore the comparator-integrator loop to a balanced or stable condition.

The comparing means may comprise an operational amplifier connected to provide a linear output and having a negative feedback circuit to control the output therefrom. Means are shown for limiting the amount of signal fed back through the negative feedback circuit to enable the comparing means operational amplifier to snap from a linear output to a predetermined saturated output. In this specific embodiment the control device actuating means advantageously includes switching means actuatable in response to an output from the comparing means amplifier which exceeds the linear portion of the amplifier output.

The integrator means may comprise an operational amplifier connected to receive at least a portion of the output from the comparing means amplifier and provide an output to the input of the comparing means amplifier which, when summed at the input of the comparing means amplifier with the proportional range reference signal, drives the output of the comparing means amplifier toward zero. The deviation signal storing means is advantageously connected to combine the deviation information therein with the output of the integrator amplifier, so that a predetermined deviation of the stored deviation signal from the balancing output of the integrator will unbalance the comparing amplifier-integrator amplifier loop and cause actuation of the switching means.

The supervisory control apparatus advantageously further includes means for varying the magnitude of the reference signal selected from the proportional operating range, in response to the actual condition of the variable to enable the supervisory control apparatus to function in a proportional-plus-reset control mode when the cooperating data processing apparatus is programmed with a reset algorithm.

The novel method of this invention for controlling a variable includes the steps of processing data in data processing means to obtain data representing the difference between an actual condition of a variable and a desired condition of a variable, and providing an operation change signal indicating the change necessary in a final control device for the variable. The operation change signal is stored in a supervisory control for the variable enabling the data processing means to perform other tasks. The operation of a final control device for the variable is modified by an amount dictated by the stored operation change signal.

The data processing means is advantageously programmed to provide an operation change signal which includes a component proportional only to the amount of the deviation of the actual condition from a desired condition for said variable, and a reset component which is related in magnitude to both the amount of deviation and time duration of the deviation of said actual condition from said desired condition. A reference signal is generated in the supervisory control which represents an operating point in the range of operation of the final control device which corresponds to the desired condition of the variable. A change is effected in the final control device by comparing the stored operation change signal with the reference signal to obtain the amount or magnitude of change in operation for the final control device. The magnitude of the reference signal generated in the supervisory control is advantageously modified in response to a modification of the actual condition of the variable to enable the supervisory control to operate in a proportional-plus-reset control mode.

Other objects, advantages, and features of this invention will become apparent when the following description is taken in conjunction with the accompanying drawings, in which.

DESCRIPTION OF THE PREFERRED EMBODIMENTS

Figure 1:
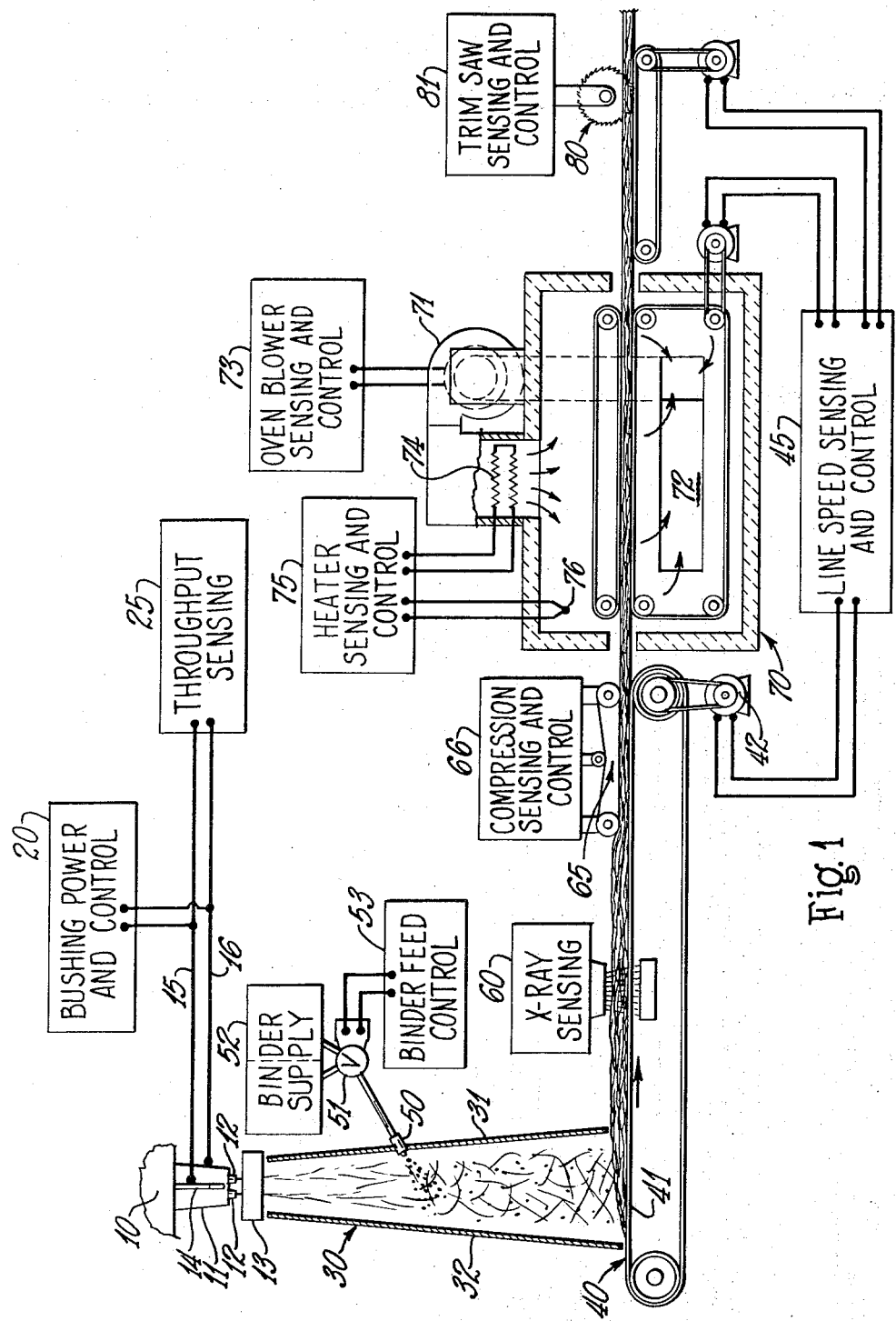
FIG. 1 is a semi-diagrammatic view of a production line embodying the teachings of this invention.

Referring to FIG. 1 there is illustrated a production line for the manufacturing of fibrous structures such as insulating wool mats, bats or the like. A molten heat-softenable material such as glass may be supplied by a forehearth 10 to a feeder or bushing structure 11 having tipped orifices 12 formed in the bottom thereof to provide streams of the molten material for attenuation into fibers. Electrical terminals 14 on each end of the feeder or bushing 11 are connected via power lines 15 and 16 to a bushing power supply and control 20. The control 20 is operative to supply current to the terminals 14 which is translated into heat flowing through the bushing or feeder 11 in an amount sufficient to maintain the molten material within feeder 11 at a desired attenuating temperature.

Figure 3:
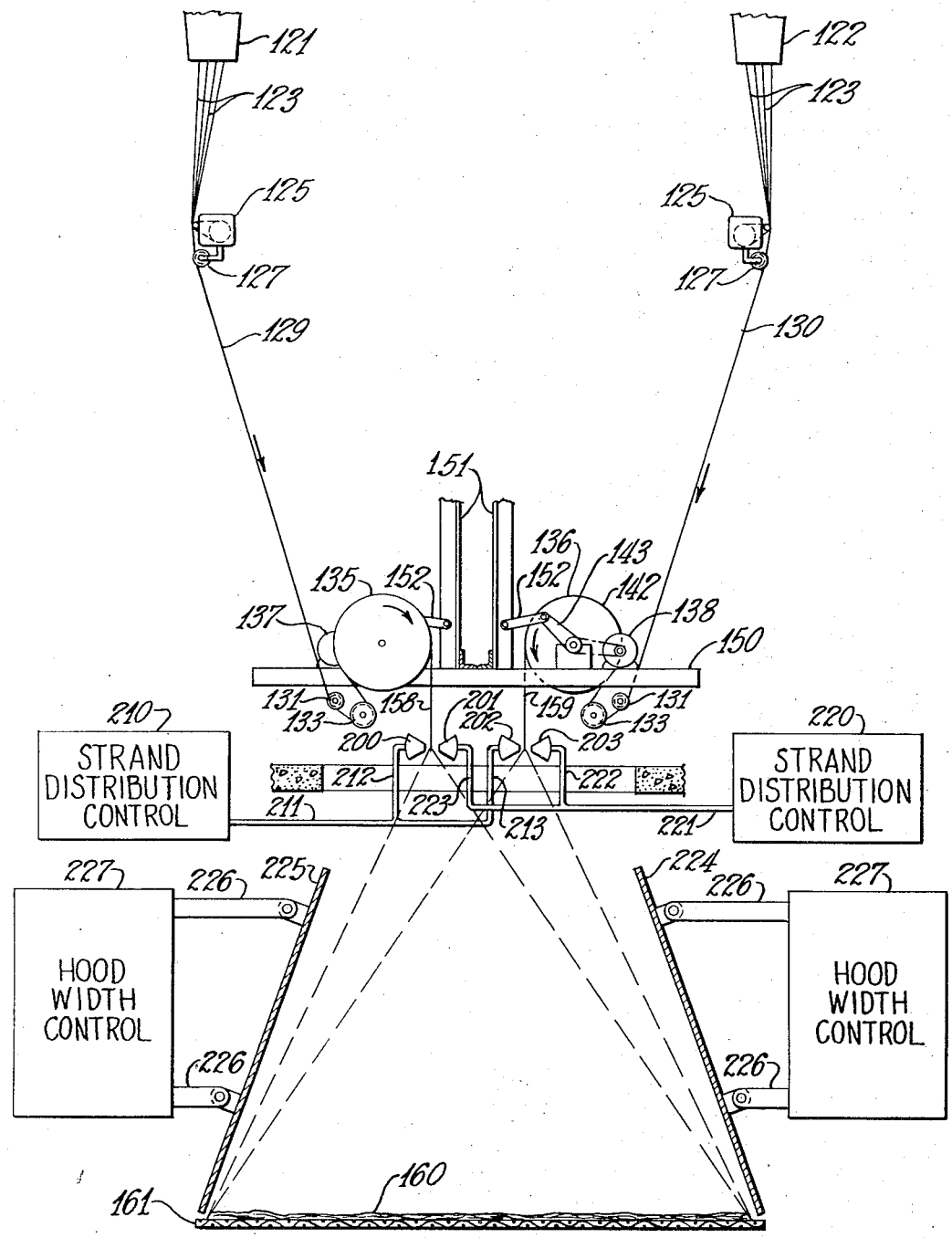
FIG. 3 is a semi-diagrammatic view of an alternative embodiment of a fiber deposition station for the formation of a mat-like mass of fibers.

While other attenuating means may be utilized as will be illustrated in FIG. 3, there is shown in FIG. 1 a blower 13 for directing gaseous blasts of steam or other gases at the streams issuing from orifices 12 to attenuate the streams into fibers which are received by a movable collecting surface means generally indicated at 40. The movable collecting surface means 40 in this instance comprises an endless belt 41, preferably of a foraminous material so that a suction may be applied beneath the belt to guide and attract the fibers to the belt and hold them in their deposited position. The endless belt is mounted on conveyor rollers which are driven by conveyor drive means 42.

Figure 2:
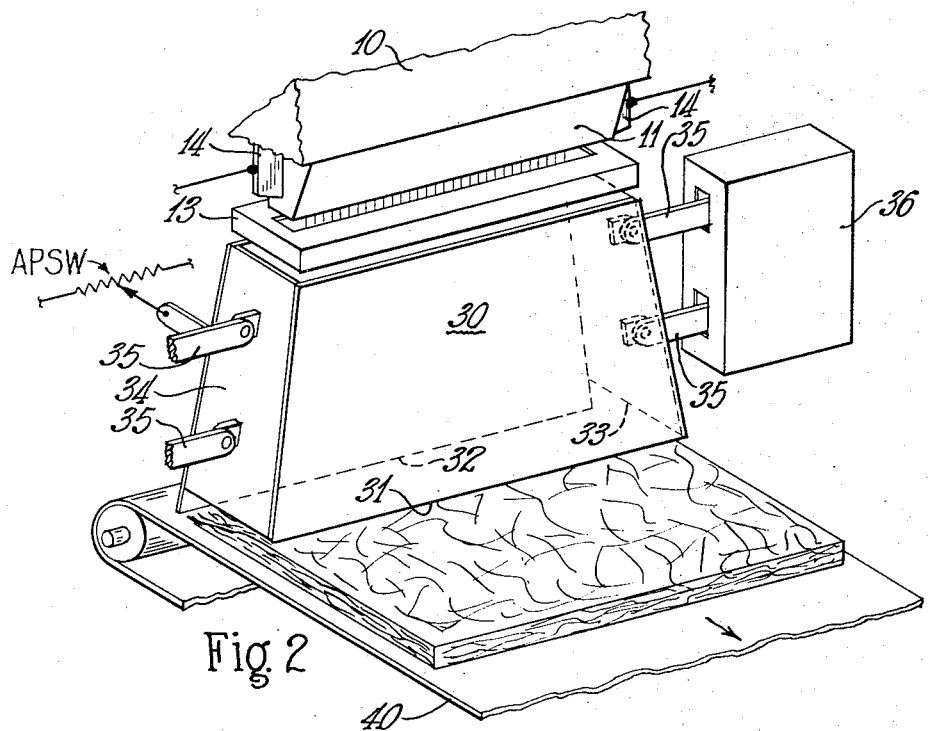
FIG. 2 is a view in perspective of an adjustable hood to control fiber deposition width on a conveyor.

A hood or shield means is generally indicated at 30 and is adapted to confine the deposition of the attenuated fibers within a predetermined area on the collecting surface. Referring to FIG. 2 it will be seen that the hood means 30 comprises a front wall 31, a rear wall 32, and side walls 33, 34. The side walls 33 and 34 are each connected via one or more arms 35 to a width control mechanism 36. The side walls 33 and 34 may thus be moved inwardly and outwardly to determine the width of the deposition of fibers on the collecting surface of the conveyor belt 41. The width adjustment control 36 may comprise a suitable mechanical linkage, e.g. a rack and pinion arrangement driven by a motor means which is responsive to a signal from a master control to set the side walls 33 and 34 at the desired width.

One or more binder dispensing means 50 are disposed to dispense a binder or other additional component in the fibers being collected on conveyor 41. The binder dispensing means may be connected via a flow control means such as a valve 51 to a supply of binder 52. The flow of binder through the valve 51 may be electrically controlled by a binder feeder control 53. Although the additional component being supplied to the fibrous mat deposited on the conveyor surface 41 is shown in the drawings as binder, it should be noted that other components may be added to the mat in addition to or instead of a binder. For example if the mat being formed is to be utilized in filter applications, it may be desirable to intersperse in the mat a collecting compound such as an oil which will cause dust or dirt particles in the air to adhere to the otherwise relatively smooth glass fibers which are integrated into a filter mat.

Means for measuring the actual deposition in terms of weight per unit area may be provided for checking, comparing and sounding an alarm, if a tolerance is exceeded, or modifying one or more of the variables involved. An X-ray sensing means 60 is suitable for such purpose. When a beam of X-rays is shot through the mat-like mass of fibers a measuring device indicates how much X-radiation is absorbed. Thus the X-ray sensing means may be set to measure the quantity of fiber per unit area and/or the quantity of binder or additional component with the fibers in the mat-like mass on the collecting conveyor 41. The X-ray sensing may provide corrective signals for the line speed control 45, the binder feed control 53, the fiber attenuation blower 13, the strand distribution controls 210, 220 in FIG. 3, and be a back-up sensor for the throughput sensing device 25 to modify the effect of the bushing power control 20 or upstream batch feeding and furnace melting conditions.

In the manufacture of a majority of the fiber structures or mats some degree of compression is desirable or necessary. Accordingly, compression roller means 65 are illustrated which are operative to compress the mat-like mass to the desired thickness. The compression roller means 65 is controlled by compression sensing and control unit 66 to adjust the compression to the amount desired. Compression of the mat or other structure may occur prior to or during a curing process for the binder or both.

An oven means 70 is illustrated for curing the binder or otherwise heat treating the additional components added via the dispenser 50. Ducts 71 and 72 are connected to circulate a gas, usually air, through foraminous oven conveyors and thus through the combined mass of binder and fibers. If heat is desired the air or gas being circulated is heated by heater 74 controlled by heater control 75 which is responsive to a thermocouple or other heat sensing means 76 disposed within the oven 70. An oven blower drive 73 senses and controls the amount of air being circulated through the fibrous structure.

It is desirable in some instances to trim the edges of the fibrous structure either to a desired width or to remove rough edges to present a smooth appearance. Trim saw means 80 is illustrated for accomplishing the trimming, the width and the speed of the trim being sensed and controlled by the trim saw control 81.

Referring to FIG. 3 there is illustrated an alternative fiber providing apparatus for manufacturing a mat made up of continuous strands containing a plurality of filaments. The apparatus in FIG. 3 includes molten glass feeding bushings 121 and 122 depending from conventional glass melting tanks which are not illustrated. Continuous filaments 123 are drawn from the minute streams of molten glass issuing from orifices of the bushings.

A size or a lubricant is applied to the filaments as they pass over the traveling belt or apron of conventional size applicators 125. The size may be merely water to reduce friction between the filaments as they are subsequently joined together in strand form. A more complex size or binder may be desired to promote coherence of the filaments when combined as strands, and adherence of the strands or filaments to the surfaces of the pulling wheel. Where a mat is to be produced, and the mat is to be ultimately combined with a plastic resin, it may also be desirable to include a coupling agent in the size which facilitates wetting of the mat by the resin.

The filaments from each bushing, after sizing, are grouped together to form a set or group of strands, the strands being individually segregated as they travel within grooves over the respective gathering shoes 127 to second gathering or aligning shoes 131.

From the shoes 131 the two sets of spaced strands 129 and 130 are led around the two idler wheels 133 and travel around the pull wheels 135 and 136. These wheels are similarly constructed but are relatively reversed in position and are on opposite sides of the center line of the receiving conveyor 161.

Motors 137 and 138, respectively, drive pull wheels 135 and 136. The strands carried by pull wheel 135 are released therefrom by the successive projection of fingers of an oscillating spoke wheel through slots in a peripheral surface of the pull wheel 135. Similarly, fingers of another spoked wheel serve this purpose in connection with the pull wheel 136. The strands are kinetically projected in tangential paths from the pull wheels. That is, the rotation of the pull wheels 135, 136 at high speeds imparts kinetic energy to each segment of the strand as it is pushed off the wheel. The strand segments are all pushed off tangentially in the same direction downwardly in the apparatus of FIG. 3.

The rear side of each pull wheel is covered by an independently mounted, oscillatable back plate on which the associated spoked wheel is carried. The back plate 142 of the assembly including the pull wheel 136 may be arcuately oscillated by movement of the arm 143. The entire assembly may be positioned on the platform 150 to support the pull wheels 135 and 136 and the equipment associated therewith. The platform 150 may be suspended by angle iron hangers 151. The arm 143 may be arcuately turned to a position to determine the tangential push-off of the strand from the pull wheel 136. If, as in this instance, it is desired that the tangential push-off causes the strand to be carried perpendicularly downwardly with their linear velocity, then the arm 143 may be secured to hanger 151 by a link 152 to retain the strand push-off at the position desired.

The group of strands 158 thrown down by the pull wheel 135, which has its push-off point also anchored by a link 152 connected to hanger 151, and the group of strands 159 thrown down by the pull wheel 136 are accumulated, after distribution, in mat form 160 upon the collection surface 161.

After the sets of strands 158 and 159 have had imparted thereto kinetic energy and thus provided with a predetermined linear velocity, aerodynamic diversion means, in this instance fluid nozzle means 200, 201 and 202, 203 for the strand sets 158 and 159, respectively, distribute the strands across the width of the collecting surface 161.

With the high peripheral speed of the pull wheel, the strands are forcefully projected in straight tangential lines from the point of disengagement effected by the fingers of the spoke wheel. The kinetic energy that the strands acquire carries them in straight courses to the region of application of aerodynamic diversion to acquire a new line of travel to the desired point on the collecting surface.

The fluid nozzles 200 through 203 and the strand distribution apparatus illustrated in FIG. 3 are described in greater detail in U.S. application Ser. No. 037,437, filed Mar. 14, 1970, and assigned to the same assignee as this application. The disclosure in the aforementioned application is included herein by reference thereto.

In the apparatus shown in FIG. 3, opposing aerodynamic means 200, 201 and 202, 203 are used for distribution. A fluid nozzle means is disposed on each side of the plane defined by the set of strands 158 or 159 leaving pull wheels 135, 136. The fluid pressures for each nozzle may be changed to vary the effect of aerodynamic diversion and thus the distribution of the strands. That is, the fluid pressures of one or both of the nozzles may be changed to obtain a sweeping distribution and, if desired, an overlap of distribution of one or more adjacent strands. This may be accomplished by the use of electrically controlled valves in the strand distribution control units 210, 220. An air supply line 211 may be connected via branch conduits 212, 213 to fluid nozzles 200, 202. An air supply line 221, may be connected from control unit 220 via branch conduits 222, 223 to fluid nozzles 203, 201. The strand distribution control units 210, 220 modulate the flow of air through the conduit 211, 221 to cause a regulated sweeping distribution of the strands across the surface 161, as noted by the dotted lines between the nozzles and the collecting surface 161 to obtain distribution of the mat 160 across the desired width of the conveyor.

The width of the mat deposited may be regulated and varied by changing the amount of air pressure supplied by the unit 210, 220 to the conduits 211, 221. The width of the mat deposited may be also regulated by the hood width control unit 227, similar to those described in FIG. 2, which through arms 226 connected to hood walls 224, 225 regulate the area above the collecting surface in which strands may be deposited or collected to form a mat-like mass.

It should be further noted that distribution of the strands back and forth across the collecting surface 161 may be accomplished by a controlled arcuate oscillation of the arms 143 by mechanisms which are known in the art. This type of strand distribution is useful for certain applications and does not require the aerodynamic distribution by the fluid nozzles.

Figure 4:
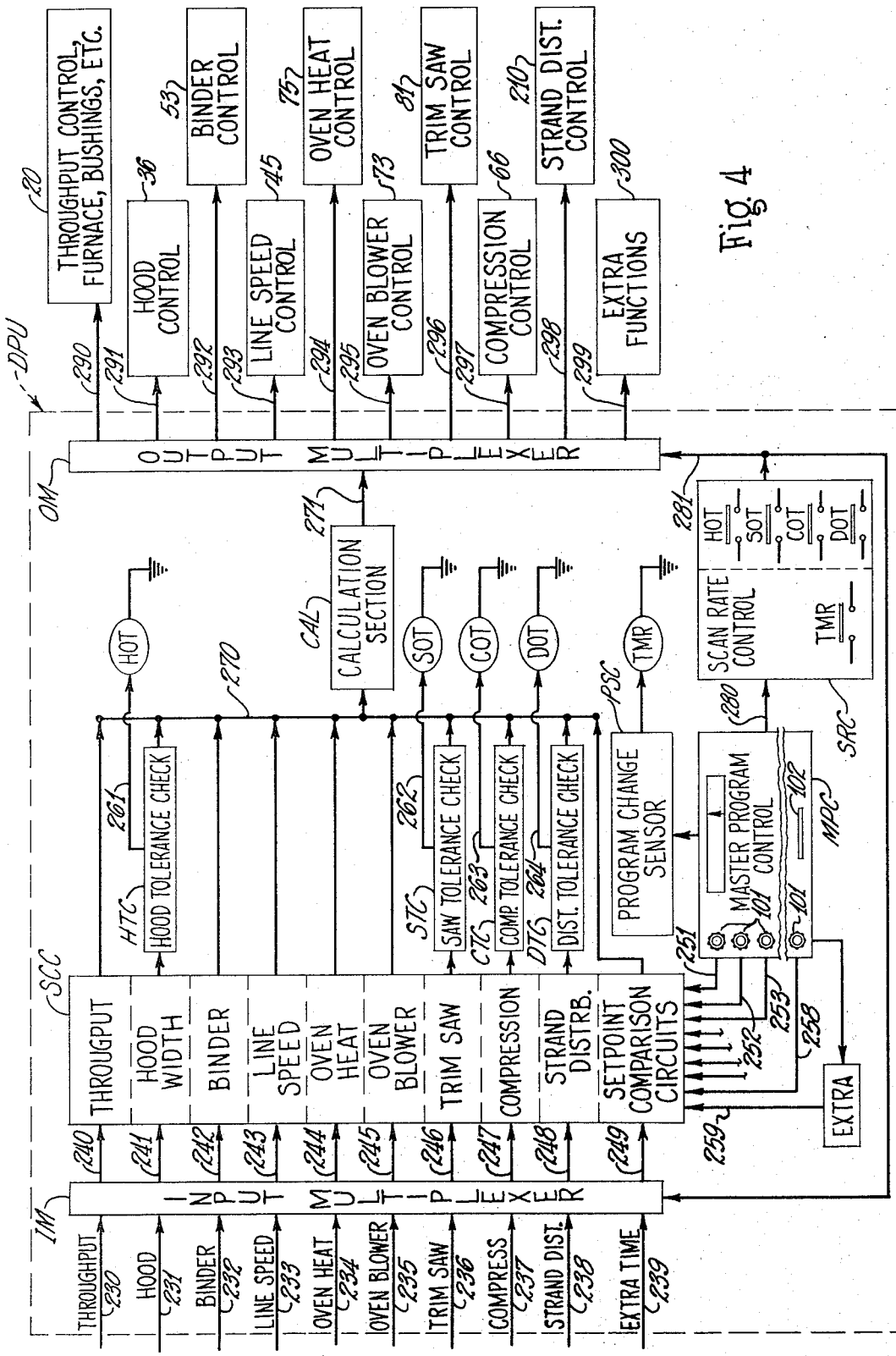
FIG. 4 is a block diagram layout illustrating a plurality of control loops useful with the apparatus illustrated in FIGS. 1 through 3, in which data processing apparatus is controlling the continuous production.

Referring to FIG. 4 there is illustrated, in block diagram form, control apparatus embodying the teachings of this invention as applicable to the apparatus illustrated in FIGS. 1 through 3. A plurality of control loops having input leads 230 through 239 provide data on the actual condition of the plurality of variables being controlled to a data processing unit indicated generally at DPU with the dotted line enclosing components of the data processing unit. A plurality of output or control signals from the data processing unit DPU are provided on output leads 290 through 299 to the variables being controlled. The variables being controlled and shown in the drawings are only illustrative of the many control functions exercised by a data processing unit in automatically controlling a continuous production line such as the glass fiber mat manufacturing line illustrated in FIG. 1.

A master program control unit MPC is illustrated as part of the data processing unit DPU and is adapted to receive program input in the form of a punched card which may be placed in slot 102 and read in the usual manner, by manual settings chosen and programmed in the machine by setting control dials or knobs 101, or in any other suitable way such as electromagnetic tape or other devices for reading settings or a computer program to a control. The input to the master control MPC provides information as to the width, thickness, density, types of binder, curing information, and other information for variables as required to make the desired product. Master control MPC may be adapted to provide output signals along leads 251 through 259 to provide a precalculated setpoint for each of the variables involved. The setpoints supplied to the setpoint comparison circuit SCC thus provides data which is indicative or representative of the desired condition of the variable being controlled.

For some variables there is little or no modification of the condition of the variable once the setpoint provided by the master control MPC has been compared with the actual condition data and the variable has been changed to the desired condition. For example, the hood with setting will seldom require modification by the adjustment means 36 in FIG. 2 for the walls 33 and 34 of the hood 30 after a job change has been completed. Similarly, it is unlikely that the compression control 66 or the trim saw control 81 will make modifications once a particular job change has been programmed into the data processing equipment and the job is in production. Some drifts may occur in these and other variables being controlled, however, and since they are important variables it is desirable to monitor those controls. Therefore, the master program control MPC supplies an output or outputs on lead 280 to a scan rate control SRC which in turn supplies outputs on leads 281 to an input multiplexer IM and to an output multiplexer OM so that all of the control loops may be monitored and correction applied if required.

A primary variable in most instances will be the throughput of the melter-feeder-attenuating mechanism which will result in a particular rate of deposition of fibers upon the collecting surface. Throughput may be sensed by unit 25 in FIG. 1 and supplies an input on lead 230 through the input multiplexer IM and on lead 240 to a throughput setpoint comparison circuit. If there is a difference between the data representing the actual condition of the throughput and the data representing the desired or setpoint condition of the throughput a signal will be presented to lead 270 to the calculations section CAL which will provide a corrective signal on lead 271 to the output multiplexer OM. The output multiplexer OM will connect the corrective signal through lead 290 to the throughput control unit 20 to modify the batch input to the furnace, the melting rate, the attenuation rate, the bushing heat, and other variables which affect the throughput of the system and the rate of deposition of the fibers on the collecting surface 41.

Assuming that there is no alteration in the primary variable the operation will proceed on the basis of the preselected settings provided by the master control MPC. That is, a predetermined throughput of fibers or rate of deposition of fibers on a collecting surface 41 will require the preselected amount of binder or additional component to be added by dispenser 50 as controlled by binder feed control 53. Further, the collecting surface will be driven past the fiber deposition station at a rate of line speed selected by and set into the line speed or conveyor speed control 45. The oven heater control 75 will insure that the preselected amount of heat will be furnished by heater 74 and that the air so heated will be circulated at a volume as preselected and set into the oven blower drive 73. Since the line speed of the conveyor or collecting surface will not be varied within a particular job change, the rotation of the trim saw 80 will need be maintained at only a certain speed.

The above variables will be controlled by the scanning or sensing of the actual condition of the variables, the comparison with that variable's setpoint in the setpoint comparison circuit SCC, and the output of correction signals from the calculation section CAL through the input and output multiplexers as described hereinbefore with respect to the control of the throughput.

While a number of the variables involved in any process will require continuous monitoring and correction if necessary, such as a primary variable as the throughput control, a number of variables need not be checked as frequently as noted hereinbefore. These variables may include devices which are set as the initial job change program is fed into the master program control MPC and will vary or drift little after that setting is achieved.

To illustrate this invention the setting of the hood width, the trim saw, the compression rollers, and the strand distribution (if the fiber providing apparatus of FIG. 3 is utilized) are chosen as variables which will need monitoring only on occasion. These variables may be controlled by mechanical devices which may have some play in the mechanical linkage, so a larger tolerance may be allowed in sensing the final setting than might be permitted otherwise. For such variables any error signal from the setpoint comparison circuit may advantageously feed to a tolerance check circuit to see if that error signal exceeds the tolerance permitted for the device being controlled. A hood tolerance check circuit HTC, a saw tolerance check circuit STC, a compression tolerance check circuit CTC and a strand distribution tolerance check circuit DTC have been included in the data processing apparatus DPU in FIG. 4 between the output of the setpoint comparison circuits and the calculation section 270.

If the error difference from the setpoint comparison circuit exceeds the tolerance range permitted, the error difference is provided as an output from the tolerance check circuit to the calculation section CAL and a correction signal is supplied through the output multiplexer to the device being controlled. In addition, if the error difference from the setpoint comparison circuit exceeds the tolerance range provided, an output is also provided to a means for changing the scan rate for that control loop. Relays HOT, SOT, COT, and BOT are responsive to predetermined differences between actual condition data on the input connections of the control loops and the desired condition data in the setpoint comparison circuits SCC, as determined by the tolerance check circuits HTC, STC, CTC, and DTC. Energization of the relays HOT, SOT, COT and DOT will close contacts in a scan rate control circuit SRC, as representatively shown to the right of the dotted line therein, to change circuits which have sensed that the tolerance has been exceeded from a slower scanning rate to a faster scanning rate until the condition or variable has been corrected.

When a job change or product change is introduced into the master program control MPC it is also desirable to automatically effect faster scan rates for the tolerance check circuits until the devices have reached the desired condition. A program change sensor PSC is responsive to the introduction of a different program or change in setpoint in the MPC and energizes a timing relay TMR when a program or setpoint change is sensed. The energization of the TMR relay will close TMR contacts in the scan rate control SRC, shown representatively to the left of the dotted line therein, to effect a faster scan rate for all of the variables being controlled for a predetermined length of time. The predetermined length of time will exceed the time normally required to make the correction and is advantageously made proportional to the magnitude of the change in the setpoint for each of the variables being controlled.

It may thus be seen that if the data processing unit DPU in FIG. 4 has a variable scan algorithm included in the program, certain loops need be scanned at a fast scan rate only when a change or alarm condition exists and a slow scan rate when no control action is required. This utilizes less computer time and provides a more stable setting for the devices between changes. More computer time becomes available when there is no job change or alarm condition for the loops having a variable scan algorithm. The extra time input 239, the internal setpoint comparison section, calculation section, etc. of the data processing unit may then be utilized to control extra functions or do other tasks as represented by the extra function block 300 receiving an output from the output multiplexer OM on lead 299.

Figure 5:
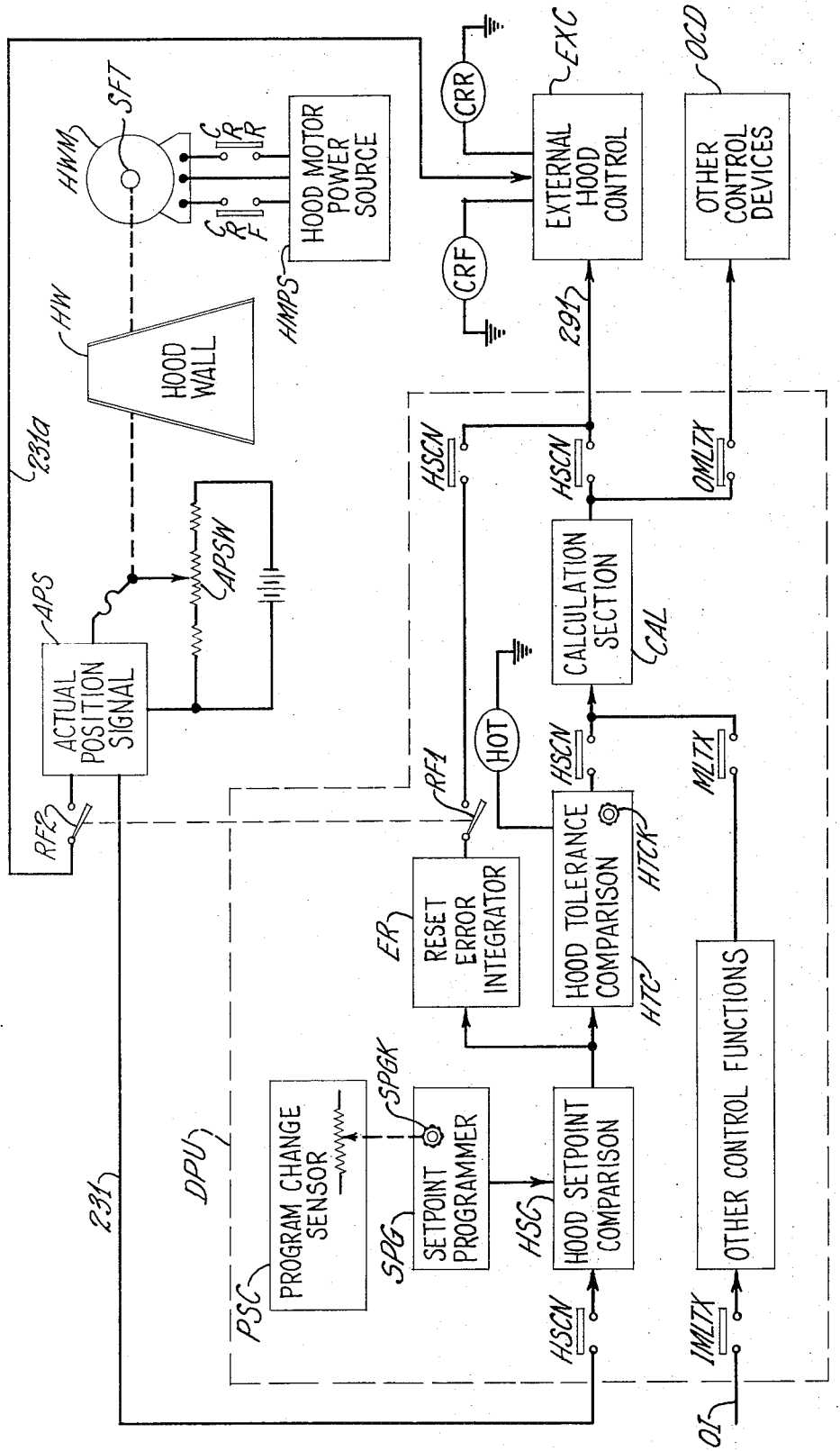
FIG. 5 is a block diagram layout in more specific detail of one of the control loops illustrated in FIG. 4.
Figure 6:
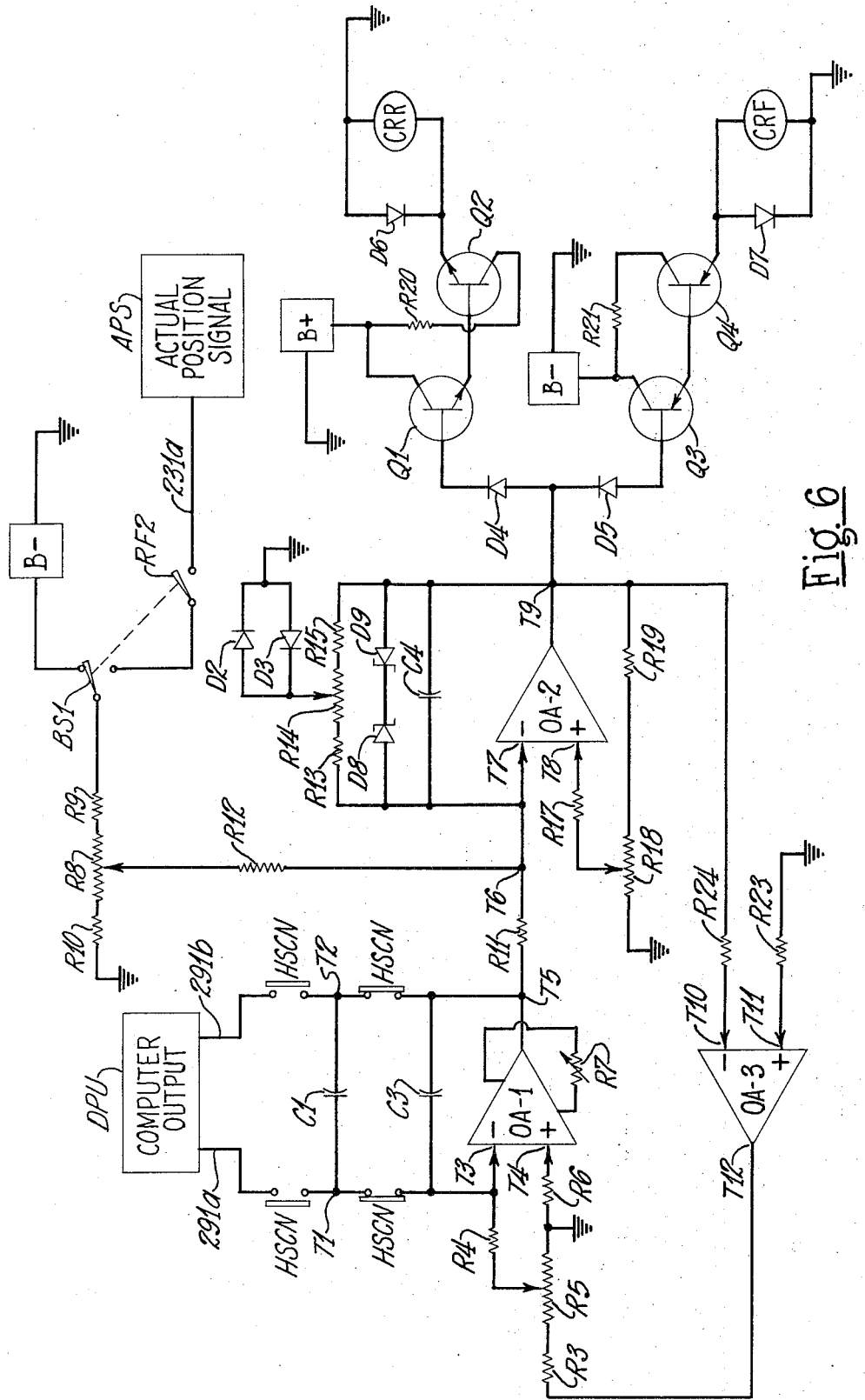
FIG. 6 is a schematic circuit diagram of supervisory control circuitry useful with the apparatus illustrated in FIGS. 4 and 5 which illustrates a specific embodiment of the teachings of this invention.

It should be noted that in FIGS. 4, 5, and 6 and elsewhere in the drawings that the control functions have been illustrated by block diagrams which represent digital computer functions, analog computer components and the like in a combination which is intended to most clearly show the invention. Thus, one skilled in analog computer or process control could readily construct apparatus based upon the disclosure herein, while one skilled in the programming of digital computer apparatus would be able to readily prepare a program which would effect an interconnection of digital computer components in the order required to accomplish the functions set forth.

Referring to FIG. 5, one of the control loops from FIG. 4 has been selected to be shown in more detail. A hood wall HW is moved between desired positions by a mechanical linkage connecting the hood wall to the shaft SFT of a hood wall motor HWM, as shown in FIGS. 1 and 3.

An external hood control circuit EXC receives a signal from the data processing unit DPU on lead 291 containing deviation information which is stored in the supervisory control EXC and utilized to move the hood wall HW back to a setpoint position. The supervisory control EXC energizes a forward run relay CRF or a reverse run relay CRR to close contacts CRF or CRR in the power leads between a hood motor power source HMPS and the hood wall motor or motors HWM, only one of a possible plurality of such motors being shown. The relays CRF and CRR, the power source HMPS, and the supervisory control EXC may be grouped together in the hood wall controls 36 of FIG. 2 or 227 of FIG. 3.

The actual condition or position of the hood wall HW is monitored by a sensing unit such as a retransmitting slide wire unit APSW, with the movable tap on the slide wire being mechanically linked to the hood wall in a manner similar to that shown in FIG. 2. An actual position signal unit APS translates the signal from the sensor APSW into a data form suitable for feeding along input line 231 of the control loop to the data processing unit DPU. The hood scan relay contacts HSCN on input line 231, output line 291, and elsewhere in the data processing unit DPU represent the contacts or other switching means in the input multiplexer IM and output multiplexer OM, respectively, shown in block diagram form in FIG. 4.

A signal representing the actual condition of the variable, in this instance the position of the hood wall HW, may also be fed back through a reset function switching means RF2 and lead 231a to the supervisory control EXC to enable the supervisory control EXC to function in a proportional-plus-rest control mode, as will be explained in detail hereinafter.

Data representing the desired position for the hood wall HW for a particular job is set into the setpoint programmer SPG, as by manually turning the adjustment knob SPGK on the programmer SPG. This provides setpoint data to the hood setpoint comparison circuit HSC in FIG. 5. An input on lead 231 is provided to the hood setpoint comparison circuit HSC when the hood control loop is scanned by the closure of contacts HSCN.

If there is no difference between actual and setpoint data then there is no output from the comparison circuit. If a difference exists, an error signal is provided by the setpoint comparison circuit HSC to the hood tolerance comparison circuit HTC. The amount of tolerance permitted for the hood has been set into the hood tolerance comparison circuit HTC, for example by manually adjusting the knob HTCK. If the error signal from the comparison circuit HSC does not exceed the tolerance set into the circuit HTC there is no output from the hood tolerance comparison circuit.

As will be discussed in greater detail hereinafter, the error signal, if smaller than the tolerance, may advantageously be fed to an error integrator of a reset function component ER, where successive small errors are added. In a manner known to those skilled in the art, the sum of the additive errors may then be added as a reset output through reset function switching means RF1 to the proportional output on output lead 291.

When the error signal from the unit HSC exceeds the tolerance range in unit HTC an output from the hood tolerance comparison circuit HTC will occur. An output in the circuit HTC may be used to energize the hood out of tolerance relay HOT to change the scan rate as hereinbefore described. An output from the circuit HTC will be directed to the calculation section CAL in which a proportional deviation signal will be provided and forwarded through the output multiplexer OM, as represented by the hood scan contacts HSCN and the oput lead 291 to the external supervisory control circuit EXC. The deviation signal will contain information which tells the circuit EXC how far to move the hood wall HW.

The input and output multiplexers IM and OM are also represented in FIG. 5 by the contacts IMLTX and OMLTX, respectively, and internal multiplexers by the contacts MLTX, to permit the use of the data processing unit DPU to take care of other control functions or to perform other tasks.

Referring to FIG. 6 there is illustrated a circuit which shows in more detail a supervisory control or external control circuit EXC illustrated in FIG. 5. The heart of the control circuit illustrated in FIG. 6 is a self-balancing or self-regulating loop which includes an operational amplifier OA-2 having a portion of its output fed back from terminal T9 to the input terminal T10 of an operational amplifier OA-3 which has a portion of its output directed from the output terminal T12 to the input terminal T3 of an operational amplifier OA-1. The output of the operational amplifier OA-1 at terminal T5 is fed to the input or summing junction at terminal T7 of the operational amplifier OA-2.

The operational amplifier OA-2 is connected to serve as a comparator for a plurality of inputs received at its summing junction T7. A negative feedback loop for the operational amplifier OA-2 consists of the serially connected resistors R15, R14 with an adjustable tap connected thereto, and R13. A capacitor C4 is connected in parallel in the negative feedback circuit with resistors R13, R14, and R15. A positive feedback loop for the operational amplifier OA-2 is connected between the output terminal T9 and the input terminal T8 thereof, and includes a resistor R19 connected in series with a resistor R18 between the output terminal T9 and ground. The resistor R18 has an adjustable tap connected thereto which connects a tapped portion of the voltage appearing across resistor R18 through the resistor R17 to the input terminal T8.

The operational amplifier OA-2 is connected as a linear inverting amplifier so that when an input is received at the terminal T7 an output will appear at terminal T9 which is opposite in polarity and proportional to the input at terminal T7. The negative feedback circuit for the operational amplifier OA-2 controls the gain and the output of the operational amplifier OA-2. As the output of operational amplifier OA-2 starts to increase it is fed back through the negative feedback loop until it reaches the value of the forward breakdown voltage of an inhibiting circuit comprising diodes D2 and D3 connected in parallel between the adjustable tap of resistor R14 and ground.

The output of the operational amplifier OA-2 between zero and the forward breakdown voltage of the diodes D2 and D3 is linear until the forward breakdown voltage of the inhibiting diodes is reached. When one of the diodes D2 and D3 breaks down in the forward direction, depending upon the polarity of the output at terminal T9, the amount of negative feedback is limited to the forward breakdown voltage. Thus the output at terminal T9 will continue to increase at an uncontrolled rate with a snap action, until it reaches the reverse breakdown voltage for one of the Zener type diodes D8, D9. The operational amplifier OA-2 is then bound and the output at terminal T9 will stabilize at the reverse breakdown voltage of the diodes D8, D9.

The output of the operational amplifier OA-2 which is connected to the positive feedback circuit of resistor R19, R18, and R17 to the positive or non-inverting input T8 of the comparator OA-2 assists the input to the comparator OA-2 which is present at the summing junction T7. The position of the adjustable tap of resistor R18 determines the amount of positive feedback to the non-inverting terminal T8 and assists in controlling the slope of the snap action portion of the output curve of the amplifier OA-2 between the linear inverting output magnitude and the bound output magnitude. Thus the positive feedback circuit assists in controlling the hysteresis of the output curve of the amplifier OA-2.

The operational amplifier OA-3 is connected as a one-to-one inverter to obtain a desired polarity of feedback signal for the self-regulating loop, and feeds back a portion of the output from terminal T9 to the operational amplifier OA-1. The current from the output terminal T12 of the amplifier OA-3 is directed through resistor R3 and resistor R5 to ground. The resistor R5 has an adjustable tap which connects a portion of the voltage on resistor R5 through the resistor R4 to the input or summing junction T3 of the operational amplifier OA-1.

The operational amplifier OA-1 is connected as an integrator and is initially set up by the adjustment of trim resistor R7, power connections, and feedback inputs through the summing junction T3 and the non-inverting junction T4 via resistor R6 so that the output from the integrator OA-1 at terminal T5 and through resistor R11 will be equal to a reference signal supplied to terminal T6 by a refernce or bias signal from a proportional range circuit. The output of the operational amplifier OA-1 connected as an integrator is stabilized by a negative feedback circuit which in FIG. 6 is shown as a capacitor C3 connected between the output terminal T5 and the summing junction T3 of the integrator OA-1.

It is desirable in a supervisory control circuit to provide a range of reference or bias signals which is proportional to the full control action of the final control element which adjusts the variable being controlled, in this instance the combination of the motor HWM and the hood wall HW. This enables selection of a particular reference signal from the range of reference signals available which reflects a desired position of the variable, i.e. the hood wall, in its full range of operating positions. To establish such a range in FIG. 6 a B- voltage supply is connected through a bias supply switch BS1, a current limiting resistor R9, a potentiometer R8 having an adjustable tap connected thereto, and a current limiting resistor R10 to a ground connection. The movement of the adjustable tap of the resistor R8 selects the desired magnitude of reference signal which is proportional or related to a desired operating position of the variable for a particular setpoint. A reference signal output is thus supplied from potentiometer R8 through resistor R12 to the terminal T6 for combination with other input voltages or currents to the summing junction T7 of the comparator amplifier OA-2.

A capacitor C1 is connected between terminals T1 and T2 to receive and store an input or deviation information signal which is derived from the computer output of the data processing unit DPU through leads 291a and 291b. Normally-open hood scan relay contacts HSCN are connected in leads 291a and 291b, while normally-closed hood scan relay contacts HSCN are connected between the output of the storage capacitor C1 and the integrator amplifier OA-1 at terminals T5 and T3. Thus when the multiplexers provide a computer output from the data processing unit DPU the normally-open HSCN contacts in leads 291a and 291b close to permit the transfer of the deviation information to the storage means capacitor C1, while the normally-closed contacts HSCN between the storage unit C1 and the operational amplifier OA-1 are opened to prevent any interference in the transfer of the correct deviation information from the data processing unit DPU to the storage unit C1.

After the information has been transferred to the storage unit C1, the normally-open contacts HSCN in leads 291a and 291b open to isolate the storage unit C1 of the supervisory control EXC from the data processing unit DPU, while the normally-closed contacts HSCN close to connect the stored signal in the storage unit C1 to the operational amplifier OA-1 at terminals T5 and T3 and in parallel with feedback capacitor C3. The negative feedback circuit capacitor C3 stabilizes the output of the operational amplifier OA-1 while the transfer function is taking place between the data processing unit DPU and the storage unit C1.

The output circuit for a forward-run relay CRF includes an isolating diode D5 connected between the output terminal T9 of the comparator OA-2 and a base electrode of a transistor Q3. A B- power supply is connected between ground and a collector electrode of the transistor Q3 and, through a resistor R21, to a collector electrode of a transistor Q4. An emitter electrode of the transistor Q3 is connected to a base electrode of the transistor Q4. The forward-run relay CRF is connected between ground and an emitter electrode of the transistor Q4. A diode D7 is connected in parallel with the actuating coil of the forward-run relay CRF to permit a prompt deenergization of the CRF relay when energizing current no longer flows therethrough.

Similarly, in the output circuit for a reverse-run relay CRR, an isolating diode D4 is connected between the output terminal T9 of the comparator OA-2 and a base electrode of a transistor Q1. A B+ power supply is connected between ground and an emitter electrode of the transistor Q1 and, through a resistor R20, to a collector electrode of a transistor Q2. An emitter electrode of transistor Q1 is connected to a base electrode of the transistor Q2. The reverse-run relay CRR is connected between ground and an emitter electrode of the transistor Q2. A diode D6 is connected in parallel with the actuating coil of the reverse-run relay CRR to permit a prompt deactuation of the reverse-run relay whenever energizing current ceases to flow through the coil thereof.

The pairs of transistors Q1, Q2 and Q3, Q4 are connected in Darlington amplifier circuits which permits energizing current to flow through the reverse-and forward-run relays CRR, CRF when a predetermined threshold signal of the proper polarity is applied to the base electrodes of the transistors Q1, Q3. In an experimental circuit the threshold value was selected as three volts.

Other voltage values of an experimental circuit utilized in testing the operation of this invention was a proportional range provided to the potentiometer R8 of minus ten volts, with the adjustable tap thereof applying a minus five volts reference signal through the resistor R12 to the summing junction T7 of the comparator amplifier OA-2. This then required that the self-regulating comparator-integrator loop be adjusted so that the integrator OA-1 provides a steady-state output of plus five volts through the resistor R11 to the summing junction T7 of the comparator amplifier OA-2, so that the loop will balance with the selected bias reference signal value tapped from potentiometer R8. The comparator OA-2 then functions as a bound amplifier in the comparator-integrator loop so that when the sum of the input currents to the input junction T7 is zero, the output from the comparator OA-2 is zero. The comparator-integrator loop is self-regulating in that any disturbance in the sum of the input currents to the summing junction T7 will cause a portion of the output voltage from the comparator amplifier OA-2 to be fed back to the input of the integrator OA-1, tending to drive the output of the integrator-amplifier OA-1 in a direction which will reduce the sum of the input currents to the input junction T7 of the comparator amplifier OA-2 to zero.

To clarify the operation of the supervisory control circuit EXC illustrated in FIG. 6, let us assume that a positive eight volt deviation signal is received from the data processing unit and stored in the storage unit C1. The positive five volt output from the integrator OA-1 is held stable at that level by the feedback capacitor C3 during the transfer of information from the computer DPU to the storage unit C1.

when the normally-closed contacts HSCN again close after the information transfer to the storage unit C1, the positive 8 volts from the storage unit C1 is then applied to the terminals T5, T3 of the integrator OA-1 providing an apparent output from integrator OA-1 of plus 8 volts. Thus, there is a difference of plus three volts at the summing junction or input terminal T7 of the comparator OA-2, since the apparent output from the integrator OA-1 exceeds the reference or bias signal from the potentiometer R8 by plus three volts.

The output of the comparator OA-2 then starts to go negative, the comparator operating as a linear inverting amplifier. As the output of comparator OA-2 starts to go negative, it is fed back through the negative feedback loop until it reaches the value of the forward breakdown voltage of the diode D3 connected between potentiometer R14 and ground. The forward breakdown voltage selected for the diodes D2, D3 in this experimental circuit is one-half volt, so that the value of feedback to the input terminal T7 available for linear control ranges only from zero to ½ volt.

The output of the comparator OA-2 is also connected through the positive feedback circuit to the positive input terminal T8 of the comparator OA-2. This positive feedback to the non-inverting input of the comparator OA-2 assists the input to the comparator OA-2 present at the summing junction T7, in this case plus three volts, causing an even greater output from the comparator OA-2. When the forward breakdown voltage of minus ½ volt is reached for the diode D3, further negative feedback is inhibited. Thus the output of the comparator OA-2 continues to go negative very rapidly or with a snap action, as assisted by the positive feedback, until it reaches a breakdown voltage for the Zener type diode D9, in this instance preferably about 12 volts. The output from the comparator OA-2 then stabilizes at minus twelve volts. When the output from the comparator OA-2 reaches a threshold voltage of minus 3 volts at terminal T9, the minus 3 volt input through the diode D5 to the base electrode of the transistor Q3 enables the Darlington amplifier to switch on and provide energizing current through the emitter-collector circuit of transistor Q4 to the forward-run relay CRF. The forward-run relay CRF is then energized and CRF front contacts are closed in FIG. 5 between the hood motor power source MHPS and the hood wall motor HWM causing the motor to turn in the shaft SFT a direction which advances the hood wall HW.

The minus 12 volt output at terminal T9 is also connected to the operational amplifier OA-3, connected as a one-to-one inverter as noted hereinbefore. A resultant output of plus 12 volts at T12 of the inverter OA-3 is attenuated by resistor R3 and part of potentiometer R5, and is applied through resistor R4 to the summing junction T3 of the integrator OA-1 as a very small positive voltage. This attenuated positive voltage drives the output of the integrator-amplifier OA-1 slowly downward from plus 8 volts toward plus five volts to balance the reference or bias signal of minus 5 volts from potentiometer R8.

The output of the integrator OA-1 continues to decrease until the difference between the output of the integrator OA-1 and the bias input from the potentiometer R8 is less than the dead band voltage established by the feedback inhibiting circuit of the parallel diodes D2 and D3 connected to the potentiometer R14. The output of the comparator OA-2 then snaps from its saturated output of minus 12 volts to the linear range of zero to ½ volt. As the output of comparator OA-2 snaps from the saturated output of minus 12 volts to the linear range of zero to 1/2 volt, the threshold voltage of minus three volts is removed from the output terminal T9. The switching current is thus removed from the base electrode of the transistor Q3, thereby deenergizing the forward-run relay CRF. The CRF front contacts open between the hood motor power source HMPS and the hood wall motor HWM in FIG. 5 to deenergize the hood wall motor HWM.

The length of time that the forward run relay CRF is energized is dependent upon the output from the computer DPU which is stored in the capacitor C1. For example, the further the value of the voltage in the storage unit C1 is from the stabilized output from the integrator OA-1, the longer the relay CRF will be energized since this indicates a greater deviation. The rate at which the self-regulating loop returns to a balanced condition is determined by the amount of attenuated feedback signal which is fed back from the output of the comparator OA-2 to the input terminal T3 of the integrator OA-1. This is determined by movement of the adjustable tap on the resistor R5, thus enabling an adjustable timing control for the length of time the final control element is to be operated.

An input from the computer DPU to the storage unit C1 which is smaller than the positive 5 volts provided by the integrator OA-1 at terminal T5 will cause, in a manner similar to that just described, an output from the comparator OA-2 which is positive. This will energize the reverse-run relay CRR in a fashion similar to that described for the energization of the forward-run relay, causing movement of the hood wall in the opposite direction.

The dead band range established by the parallel diodes D2, D3 and the setting of the adjustable tap on the resistor R14 may be adjusted so that a predetermined variance from the stabilized output of plus 5 volts of the integrator OA-1 is required before the snap action of the comparator OA-2 occurs and the energization of one of the relays CRR or CRF is enabled. That is, as long as the output from the comparator OA-2 is in the linear range from zero to ½ volt in response to an unbalanced input at the summing junction T7, a snap action effected by the feedback inhibiting diodes D2, D3 will not occur. Therefore, the threshold value necessary at terminal T9 to cause a switching action to energize the relays CRR or CRF will not be reached. Thus, the dead band may be utilized to filter out transients and to reject small deviations from a desired setpoint which are not large enough to affect the quality of the product being made.

However, even though the output from the comparator OA-2 is in the linear range in response to a small amount of deviation information at the input summing junction T7, the self-balancing action of the loop will be effective to restore the loop to the zero output condition at the comparator OA-2 to ready the loop for deviation information that is later applied which does require correction.

The connections of the circuit just described enable the supervisory control to operate in a proportional-position control mode. Generally speaking, in this control mode there is a continuous linear relation between the value of the controlled variable, in this instance the width of the mass being deposited, and the position of the final control element for the manipulated variable, in this instance the position of the hood wall, within the proportional band. The proportional band is normally the change in value of the controlled variable which is necessary to cause full travel of the final control element. However, a proportional-position control mode responds only to the amount of deviation and there is no correction without deviation. Thus, a proportional-position control mode can produce an exact correction for only one load or setpoint condition. At all other loads, there must be some deviation or error left. This error is called offset or droop. The offset or droop for a new setpoint position could be eliminated by manually changing the potentiometer R8 to establish a new selected reference signal which is proper for the new setpoint position of the hood wall.

In a floating control mode, the position of the final control element is changed in response to both the amount and the time duration of the deviation. Thus, the floating control mode continues to change a control element until it does produce an exact correction for any load change.

It is therefore desirable to provide the supervisory control circuit EXC with the ability to function in a proportional-plus-reset control mode which combines a "proportional" signal component generated in response to the amount of deviation with an additional "reset" signal component generated in response to both the amount and time duration of the deviation, so that movement of the final control element will continue until there is no deviation left. In this control mode the offset or droop error is eliminated, but the stability of the proportional-position type of control mode is retained.

As noted hereinbefore, a proportional-position control mode of the circuit of FIG. 6 may be satisfactory since, when the setpoint or load condition is changed the amount of offset or droop may be within the tolerance range provided either in the computer or in the supervisory control circuit. As also noted the setting of the potentiometer R8 may be manually changed to compensate for the offset or droop. However, if the setpoint or load changes are sufficiently large, or if there is some drift in the control elements or circuits because of changes in ambient temperatures or wear in mechanical linkages, the proportional-position control mode may not be able to fully make the adjustment desired.

It is known in the art to provide a reset function in data processing apparatus which is responsive to continuing small errors or is responsive to the amount and time duration of deviation to provide a "reset" output signal component in addition to the "proportional" output component from the data processing apparatus. This function is represented in FIG. 5 by the reset integrator component ER. The output of the reset integrator component ER is connected through a reset function switching means RF1 and scanning contact HSCN to the output lead or leads 291 of the data processing unit DPU.

A mechanical linkage is shown in FIG. 5 connecting the reset function switching means RF1 and RF2 to symbolically illustrate that if the reset function is desired to be added to the "proportional" component of the output signal from the data processing unit, then an actual position signal will also be connected from the unit APS through switching means RF2 and lead 231a to the external hood control circuit EXC.

In FIG. 6 the signal from the actual position indicator APS is shown as fed through the lead 231a through the reset function switching means RF2 and the bias switch BS1. Again, switching means RF2 and BS1 are shown mechanically linked to symbolically represent that the normal proportional band B— voltage supply will be disconnected from the potentiometer R8, and a voltage related in magnitude to the actual position of the hood wall will be connected to potentiometer R8 when the reset function switching means RF2 is closed. Thus, a voltage is supplied to the potentiometer R8 which is a function of the actual position of the hood wall HW.

The tap on the potentiometer R8 may then be adjusted for best operation of the supervisory control circuit when the position of the hood wall is at a known location, e.g. midway in its range of travel. The voltages for the remainder of the supervisory control circuit EXC are adjusted accordingly. With the reset function switches RF1 and RF2 closed and the bias switch BS1 closed to connect the reset function signal from the unit APS to the potentiometer R8, the amount of voltage appearing across the potentiometer is dependent upon the actual position of the hood wall HW. Thus, when there is a setpoint change by the setpoint programmer SPG there will be a repeated application of the new deviation amount to the storage portion C1 of the supervisory control EXC. The "proportional" component of the output signal from the data processing unit will function in the same manner as described hereinbefore for the proportional-position control mode. However, a "reset" component of the deviation signal will be added to the leads 291 to the storage unit C1 to effect an exact correction of the deviation.

To enable the supervisory controller to react and carry through on the proportional-plus-reset control mode the range of proportional band voltage available for the potentiometer R8 will be changed as the actual position of the hood wall changes, thus changing the voltage supplied from the unit APS to the potentiometer R8. The supervisory control circuit will then automatically stabilize the output of the integrator OA-1 at the new setpoint position for the hood wall, enabling the comparator-integrator loop to be self-balancing and self-regulating from the new reference signal point as supplied by the changed voltage available from the potentiometer R8.

There has thus been disclosed a method for controlling a variable which includes the steps of sensing data representing the actual condition of a variable, comparing the actual condition data of the variable with setpoint data representing a desired condition of the variable, and providing an output signal indicating the deviation of the variable from a desired condition. The output deviation signal is stored in an intermediate supervisory control device. The stored output signal is compared with a reference signal in the supervisory control apparatus which represents a desired operation point in the range of operation of a final control device for the variable. A change is effected by the supervisory control in the actual condition of the variable, the change being related in magnitude to the difference between the actual condition of the variable as indicated by the deviaion information in the stored signal in the supervisory control and the desired operating point as indicated by the reference signal.

The magnitude of the reference signal may be advantageously varied in response to a change in the actual condition of the variable to reflect a change in load conditions for the variable, or to reflect the change which occurs when the setpoint data representing the desired condition of the variable is changed, to enable a more accurate correction of a deviation.

The supervisory control apparatus or method is thus independent of the data processing apparatus or computer from which it receives deviation information. The computer merely processes data to obtain data representing the difference between an actual condition of a variable and a desired condition for a variable. The data representing the difference between the actual and desired conditions is stored in the supervisory control apparatus, and a change is effected in the actual condition of the variable by the supervisory control apparatus by modifying the operation of a final control device for the variable an amount related in magnitude to the difference indicated by the deviation data stored in the supervisory control.

In conclusion, it is pointed out that while the illustrated examples constitute practical embodiments of my invention, I do not limit myself to the exact details shown, since modification of these details may be made without departing from the spirit and scope of this invention.

I claim:

1. Supervisory control apparatus for use as an interface between data processing means and a final control device for regulating a variable, comprising
   a. means for receiving and storing an input signal from data processing means carrying information indicating the amount of deviation from a desired condition of a variable being controlled,
   b. means actuatable in response to deviation information in an input signal in said storing means for initiating modification of the state of regulation of a final control device for the variable to change the variable toward a desired condition, and
   c. means actuatable in response to deviation amount information in the input signal for terminating the modification initiated in the state of regulation of the final control device after a change has been effected in said state of regulation which is related in magnitude to the amount of deviation indicated by the input signal in said storing means.

2. Apparatus as defined in claim 1 in which said modification initiating means includes
   a. means for providing a reference signal, and
   b. means for comparing said reference signal with an input signal in said storing means and providing an output signal when said input signal carries magnitude of deviation information.

3. Apparatus as defined in claim 2 in which
   a. said comparing means provides an output signal related in magnitude to the deviation of a variable from a desired condition, and in which
   b. said modification terminating means includes means responsive to said comparing means output signal for removing the magnitude of deviation information from an input signal at a rate related to the amount of deviation information in said input signal.

4. Supervisory control apparatus for use as an interface between data processing means and a final control device for regulating a variable, comprising
   a. means for receiving and storing an input signal indicating the amount of deviation of a variable from a desired condition; and
   b. means responsive to a stored input signal for actuating a final control device for said variable to modify the actual condition of a variable an amount related in magnitude to the amount of deviation indicated by said stored input signal;
   c. said control element actuating means comprising switching means, means responsive to deviation information in a stored input signal for providing an actuating signal for said switching means, and means responsive to the amount of deviation information in said input signal for terminating said actuating signal after a length of time related to the amount of deviation indicated by said stored input signal.

5. Supervisory control apparatus for use as an interface between data processing means and a final control device for regulating a variable, comprising
   a. means for receiving and storing an input signal indicating the amount of deviation of a variable from a desired condition; and
   b. means responsive to a stored input signal for actuating a final control device for said variable to modify the actual condition of a variable an amount related in magnitude to the amount of deviation indicated by said stored input signal;
   c. said control device actuating means comprising means for providing a proportional range of signals related to the change in value of the controlled variable necessary to cause full control action for the final control device controlling said variable, means for selecting a proportional signal from said range of signals related to the desired control action of the final control device to obtain a desired condition of the variable being controlled, and means for comparing said stored input signal with said selected proportional signal and providing an output signal in response to deviation information in said stored input signal.

6. Apparatus as defined in claim 5 in which said control device actuating means further includes
   a. integrating means responsive to a signal fed back from said comparing means output for providing a balancing signal for comparison with said selected proportional signal at the input of said comparing means,
   b. said integrating means being responsive to an output from said comparing means to change the value of said balancing signal in a direction to reduce the output of said comparing means.

7. Apparatus as defined in claim 6 in which said control device actuating means further includes
   a. switching means responsive to an output from said comparing means for actuating a final control device, and which further includes
   b. means for controlling the amount of comparing means output signal fed back to said integrating means to determine the rate of reduction of said comparing means output signal.

8. Apparatus as defined in claim 5 in which
   a. said comparing means includes negative feedback means connected between the output and input thereof to cntrol the amount of output therefrom,
   b. said negative feedback means including means responsive to a predetermined magnitude of output signal from said comparing means to inhibit the control action of said negative feedback means to permit the output of said comparing means to increase rapidly from said predetermined magnitude to a maximum output.

9. Apparatus as defined in claim 8 in which said control device actuating means further includes switching means actuatable only in response to an output signal from said comparing means which is in excess of said predetermined magnitude necessary to inhibit said negative feedback means.

10. Apparatus as defined in claim 8 in which said comparing means further includes adjustable positive feedback means connected between the output and input thereof to enable control of the slope of the output signal of said comparing means when said negative feedback means is inhibited.

11. Apparatus as defined in claim 5 which further includes means for varying the size of said proportional range in response to the actual condition of said variable to enable said supervisory control apparatus to function in a proportional-plus-reset control mode.

12. Supervisory control apparatus for use as an interface between data processing means and a final control device for regulating a variable, comprising
    a. means for receiving and storing an input signal indicating the amount of deviation of a variable from a desired condition;
    b. means responsive to a stored input signal for actuating a final control device for said variable to modify the actual condition of a variable an amount related in magnitude to the amount of deviation indicated by said stored input signal;
    c. said control device actuating means comprising means for selecting a reference signal which is related to a desired condition for said variable from a range of reference signals, the range of said reference signals being related to the control range of the final control device, means for comparing said input signal and said reference signal to detect deviation information in said input signal and provide an output signal in response to deviation of said variable from a desired condition, means responsive to a predetermined output from said comparing means for initiating actuation of a final control device to modify the actual condition of said variable, and means responsive to the magnitude of deviation indicated by said input signal for terminating the modification started by said initiating means after a modification has been effected which is related in amount to said magnitude of deviation.

13. Apparatus as defined in claim 12 in which
    a. said comparing means comprises an operational amplifier connected to provide a linear output and having a negative feedback circuit to control the output therefrom, and which further includes
    b. means for limiting the amount of signal fed back through said feedback circuit to enable the amplifier to snap from a linear output to a saturated output.

14. Apparatus as defined in claim 13 in which said final control device actuating means includes switching means actuatable in response to an output from said comparing means amplifier which exceeds the linear portion of the output therefrom.

15. Apparatus as defined in claim 13 in which
    a. said modification terminating means includes an operational amplifier connected as an integrator,
    b. said integrator amplifier being connected to receive at least a portion of the output from said comparing means amplifier and provide an output to said comparing means amplifier which, when summed at the input of said comparing means amplifier with said reference signal, drives the output of said comparing means amplifier toward zero.

16. Apparatus as defined in claim 15 in which said input signal storing means is connected to combine said input signal with the output from said integrator amplifier so that a predetermined deviation of the stored input signal from the integrator output will unbalance the comparing amplifier-integrator amplifier loop and cause actuation of said switching means.

17. Apparatus as defined in claim 16 which further includes means for adjusting the amount of comparing means amplifier output fed to said integrator amplifier to adjust the length of time required for the comparing amplifier-integrator amplifier loop to attain a balanced condition, thereby also adjusting the length of time said output is provided to actuate a final control device.

18. Apparatus as defined in claim 12 in which said means for selecting a reference signal includes means responsive to the actual condition of said variable for selecting a reference signal related in magnitude of the actual condition of said variable.

19. Apparatus for controlling a variable, comprising
    a. data processing means including means for sensing the actual condition of a variable, comparing the actual condition of the variable with a desired condition for the variable, and providing an output signal indicating the amount of deviation of the variable from said desired condition;
    b. supervisory control apparatus including means for receiving and storing said deviation signal from said data processing means, and means responsive to a stored deviation signal for providing a control signal to a final control means for the variable to modify the actual condition of the variable an amount related to the amount of deviation indicated by said stored deviation signal; and
    c. final control means responsive to said supervisory apparatus for modifying the actual condition of said variable.

20. Apparatus as defined in claim 18 in which
    a. said data processing comparing means includes means for providing a proportional component for said deviation signal which is related in magnitude only to the amount of deviation of said actual condition from said desired condition, and further includes means for providing a reset component of said deviation signal which is related in magnitude to both the amount of deviation of said actual condition from said desired condition and to the time duration of said deviation; and in which
    b. said supervisory control apparatus includes means for selecting a reference signal which is related in magnitude to a desired condition for said variable, and means for comparing said reference signal with a stored deviation signal to detect deviation information and provide said control signal for said final control means;
    c. said supervisory control apparatus further including means for varying the magnitude of said reference signal of said supervisory control apparatus in response to the actual condition of said variable to enable said supervisory control apparatus to function in a proportional-plus-reset control mode.

21. Apparatus for manufacturing a glass fiber mat, comprising
    a. a deposition station for providing glass fibers;
    b. collecting surface means movable past said deposition station to receive glass fibers thereon in a mat-like mass;
    c. means for controlling the deposition of fibers on said collecting surface means and processing said mat-like mass of fibers downstream from said deposition station to provide a finished glass fiber mat;

d. data processing means for monitoring the characteristics of operation of said deposition and processing means including means for providing data on the actual condition of each of a plurality of variables in depositing said fibers and processing said mat-like mass, and for comparing actual condition data of each of said variables with data representing the desired condition of each variable and providing an output signal indicating the amount of deviation of each variable from the desired condition; and e. supervisory control apparatus including final control means for at least one of said variables, means for receiving and storing the deviation signal for said one variable from said data processing means, and means responsive to said stored deviation signal for providing a control signal to said final control means to effect a modification in the actual condition of said one variable which is related in magnitude to the deviation indicated by said stored signal.

22. Apparatus as defined in claim 21 in which a. said data processing means includes means for providing a deviation signal which includes a proportional component related in magnitude only to the amount of deviation between actual and desired conditions for said one variable, and a reset component related in magnitude to both the amount of deviation between actual and desired conditions of said one variable and to the time duration of said deviation; and in which b. said supervisory control apparatus includes means for providing a reference signal related in magnitude to a desired condition for said one variable and to the actual condition of said one variable, and means for comparing said stored deviation signal with said reference signal to provide said control signal for the final control means for said one variable.

23. Apparatus as defined in claim 22 which further includes means for varying the magnitude of said reference signal in response to a variance in the actual condition of said one variable to enable the provision of a control signal by said supervisory control apparatus which is responsive to changes in the desired condition of said one variable and changes of desired condition data in said data processing means.

24. A method for controlling a variable comprising the steps of a. sensing data representing the actual condition of a variable, comparing the actual condition data of said variable with setpoint data representing a desired condition of said variable, and providing an output signal indicating the deviation of said variable from a desired condition; and b. storing said output deviation signal, comparing said stored output deviation signal with a reference signal representing a desired operation point in the range of operation of a final control device for said variable, and effecting a change in the actual condition of said variable related in magnitude to the difference between the actual condition of said variable as indicated by the deviation information in said stored output signal and the desired operating point as indicated by said reference signal.

25. A method as defined in claim 24 which further includes varying the magnitude of said reference signal in response to a change in the actual condition of said variable to reflect a change in load condition for said variable which occurs when the setpoint data representing the desired condition of said variable is changed to enable a more accurate correction of a deviation.

26. A method for controlling a variable comprising a. processing data in data processing means to obtain data representing the difference between an actual condition of a variable and a desired condition for a variable, and providing an operation change signal indicating the change necessary in a final control device for said variable;

b. storing said operation change signal in a supervisory control for said variable enabling the data processing means to perform other tasks; and c. modifying the operation of a final control device for said variable an amount indicated by said stored operation change signal, d. providing in said data processing means an operation change signal which includes a component proportional only to the amount of the deviation of the actual condition from a desired condition for said variable and a reset component which is related in magnitude to both the amount of deviation and the time duration of the deviation of said actual condition from said desired condition; and e. generating a reference signal in said supervisory control which represents an operating point in the range of operation of said final control device for said desired condition of said variable; and f. effecting said change in said final control device by comparing said stored operation change signal with said reference signal to obtain the magnitude of change in operation for said final control device.

27. A method as defined in claim 26 which further includes the step of modifying the magnitude of said reference signal generated in said supervisory control in response to a modification of the actual condition of said variable to enable said supervisory control to operate in a proportional-plus-reset control mode.

28. A method for manufacturing a glass fiber mat including the steps of a. moving a fiber collecting surface past a fiber deposition station;

b. providing, depositing and processing glass fibers in a mat-like mass on said collecting surface;

c. processing data in data processing means to obtain data representing the difference between the actual conditions and the desired conditions of the plurality of variables involved in said providing, depositing and processing of said glass fibers to obtain a finished glass fiber mat with desired characteristics, and providing an operation change signal for at least one of said variables indicating the change necessary in a final control device for said one variable to eliminate a deviation between an actual and a desired condition for said one variable;

d. storing said operation change signal in a supervisory control for said one variable enabling processing of data in said data processing means for other variables; and e. modifying the operation of said final control device for said one variable an amount dictated by said stored operation change signal.

* * * * *